United States Patent Office 3,511,488
Patented May 12, 1970

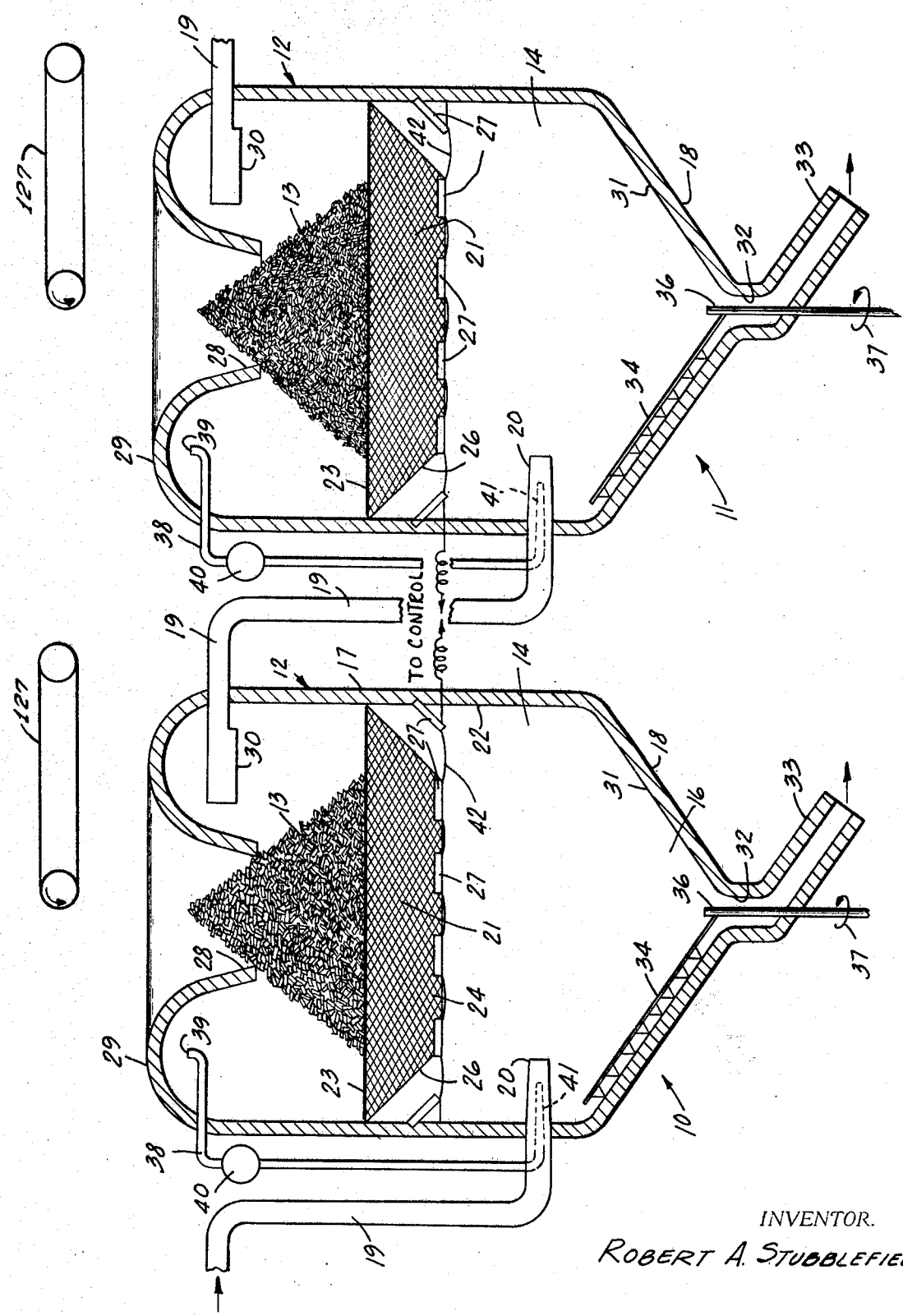

3,511,488
ULTRASONIC COPPER PRECIPITATOR
Robert Arthur Stubblefield, 219 F St.,
Salt Lake City, Utah 84103
Filed Sept. 29, 1966, Ser. No. 582,952
Int. Cl. C22b 3/02
U.S. Cl. 266—22                                                   4 Claims

ABSTRACT OF THE DISCLOSURE

A copper precipitator apparatus wherein a vessel containing an acidic solution and in which a supply of scrap iron is supported includes a shrouded top overlying the scrap iron for trapping hydrogen gases generated during the precipitating process. Means are provided for recirculating the hydrogen gases from the shrouded top back into the acidic solution to inhibit the dissolution of iron by the acidic solution.

---

This invention relates generally to methods and apparatus for precipitating metals from aqueous solutions and more particularly for precipitating copper from highly dilute acidic solutions thereof by utilizing and exploiting high frequency vibrations of ultrasonic generators located in the precipitator vessel to strip or scrub copper particles from iron used in a precipitating process.

As the world's resources of high grade copper ore are depleted, new methods are being developed in an attempt to economically extract copper from the lower grade ores and old slag dumps. One of the more promising of these new methods is hydrometallurgical digestion which uses bacterial leaching, high pressure leaching and the like to dissolve the copper into a solution.

After the copper is in solution, free iron is usually used to replace the copper in the solution and the metallic copper is collected in the form of cement copper. The chemical means of replacing the copper by iron in the solution is accomplished by depositing scrap iron or pelletized cast iron in the solution. An ion of copper attaches itself to the iron and an ion of iron replaces the copper in the solution. The more copper that is deposited on the surface of the iron, the less iron is aavilable to replace the copper in the solution so that the rate of copper precipitation decreases with an increase of copper plating on the iron. However, if the surface of the iron is kept relatively clean, as accomplished, for example, by the scrubbing action resulting from a rapid flow of the solution over the surface of the iron, the rate of precipitation of the copper is increased.

At the present time, such mehods of precipitating copper from solution utilize a vertical cone precipitator, the apex of which is at the bottom. The cone is generally filled by a belt conveyor or the like conveyance with a batch of shredded beer cans, or other scrap iron, or both. A pump delivers a stream of a pregnant copper solution into the bottom or apex of the cone and as the solution rises within the cone, it contacts the iron with a resultant chemical reaction in which the copper replaces the iron.

The solution is delivered to the bottom of the cone at a relatively high velocity whereby the iron precipitant is actually dynamically suspended in the solution and is subjected to a forceful scrubbing action as a result of the attendant turbulence. Because of the inverted conical shape of the precipitator the dynamic suspending action progressively decreases as the solution rises in the vessel and as its flow velocity decreases by reason of area increase. The barren solution is relatively quiescent at the top of the precipitator where it is generally allowed to overflow to a drain.

The precipitated copper particles are carried to approximately one-half to two-thirds the height of the cone by the dynamic action of the rising stream of solution. Generally, after the entire batch of precipitant has dissolved, the precipitator is drained at the bottom to remove the copper particles.

Several undesirable characteristics of the aforementioned processes have become manifest. One drawback relates to the high costs involved in pumping the solution into the precipitator and another relates to a lack of satisfactory regulation of the sizes of the precipitated copper particles.

Regarding pumping costs, controlled experiments have proven that the rate of precipitation of copper on iron from a weak acid solution is proportional to the velocity of the soltuion relative to the iron particles. These experiments indicate that a velocity in excess of twenty feet per second is required to obtain optimum recovery of copper from the solution.

In processes utilizing conventional cone-type precipitators, high powered pumps are generally required to produce a relatively high veolcity solution stream with the attendant agitation necessary to strip or scrub the copper from the iron. The high velocity of the solution actually performs two functions: (1) it decreases the thickness of the boundary layer, or layer of solution free of copper ions, adjacent to the iron particles; and (2) if mechanically scrubs or strips off the copper particles that plate the iron, thus making clean iron available to the copper solution.

Regarding the lack of regulation of the sizes of the copper particles, the heterogeneous conglomeration of shredded iron through which the solution passes makes the relative speed of solution to iron substantially impossible to control. As a result the sizes of the precipitated copper particles vary over a wide range, tending primarily toward the extremely fine and microscopic sizes.

These minute particles of copper are affected by the Brownian motion and settling rates are long. Filtering is equally difficult and costly, and in addition the tiny particles are oxidized to render them generally unsatisfactory for commercial use by the paint, insecticide and other industries which use a pure copper product which has not been smelted.

A further costly characteristic of the conventional systems is the excessive digestion of iron by the acid as exemplified by the following formula:

(1) 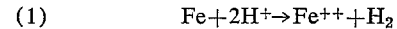 $Fe + 2H^+ \rightarrow Fe^{++} + H_2$

The need for violent agitation of the solution to free the copper also enhances the dissolution of iron into the solution. While this serves no practical purpose, it does dissipate an additional quantity of expensive iron (in excess of the minimum amount required for copper recovery), as exemplified by the following formula:

(2) 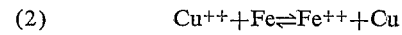 $Cu^{++} + Fe \rightleftharpoons Fe^{++} + Cu$

An object of the present invention is to increase the efficiency of precipitating processes while providing a more desirable product. In accordance with the invention, the velocity of the solution in the precipitator vessel can be substantially reduced since ultrasonic sound rather than the agitation and turbulence of the precipitant is utilized to strip or scrub the copper particles from the iron. The high frequency vibrations of ultrasonic generators, located in the precipitator vessel, remove the copper plating from the iron as a result of the varying response of the copper and iron to the impinging vibrations. Such varying responses produce an instantaneously enlarging interface which separates the two metals.

The present invention is further characterized by the utilization of controls to activate and deactivate or pulse the ultrasonic generators for selected time intervals. Between successive periods of activation of the generators, the layer of copper is allowed to build up on the iron to a desired thickness and thus, by regulating the time intervals for pulsation of the generators, the size of the precipitated copper particles can be controlled to a high degree. In scrubbing the iron, experiments indicate that a generation of strong ultrasonic sound waves for a period of 10 to 15 seconds duration is sufficient.

The present invention also contemplates the provision of a shrouded top for the precipitator whereby the hydrogen gases generated during the chemical process are trapped and circulated back into the solution whereby the law of mass action is utilized to inhibit the dissolution of iron by the acid as exemplified by the formula (3) $$Fe + 2H^+ \rightleftharpoons Fe^{++} + H_2$$

In addition, the recirculated hydrogen gas reduces the ferric ions in the incoming solution to the ferrous state in accordance with the formula (4) $$2Fe^{+++} + H_2 \rightarrow 2Fe^{++} + 2H^+$$

This reduction of ferric ions is particularly advantageous since the presence of such ions increases the consumption of iron and it makes the currently known processes less economical according to the chemical reaction (5) $$2Fe^{+++} + Fe \rightleftharpoons 3Fe^{++}$$

This formula also indicates that the reduction of ferric ions by hydrogen generates hydrogen ions which reduces the acid consumption and also reduces many of the other oxidizing agents such as the dissolved atmospheric oxygen.

The result is a considerable savings in the iron consumption, for example, up to 50% of that used in launder precipitation.

Because of the relatively reduced velocity of the solution in the precipitator, the present invention also contemplates the utilization of a quiescent settling zone at the bottom of the precipitator down to which the precipitated copper particles descend gravitationally. Means are provided for removing the copper particles from the walls of the settling basin periodically while the copper solution is still being delivered to the precipitator. This arrangement confers upon the present invention the ability to operate in a truly continuous process, as contrasted with the batch operations of the known processes.

It is, therefore, an object of the present invention to provide improved metallurgical precipitation and apparatus for carrying out such processes.

Another object of the invention is to reduce costs involved in the operation of pumping the solutions through the precipitator.

Another object of the invention is to provide means for scrubbing or removing copper particles from scrap iron in a precipitating process involving the exchange of copper and iron ions through the utilization of ultrasonic sound.

Another object is to provide means for controlling to a substantial degree the sizes of the precipitated copper particles.

Still another object is to advantageously utilize the hydrogen gas evolved from the chemical reaction to increase the efficiency and economy of the process by reducing the consumption of precipitant and solution.

A further object is to provide a more simplified and effective continuously operating precipitating process.

Another object of the invention is to simplify the construction of the precipitator by eliminating the necessity for a given conical configuration to reduce the flow of solution as it rises within the precipitator.

Many other features, advantages and additional objects of the present invention will become manifest to those versed in the art upon making reference to the detailed description which follows and the accompanying sheet of drawings, in which preferred structural embodiments incorporating the principles of the present invention are shown by way of illustrative example only.

On the drawings:

The figure represents a vertical cross-sectional, partially schematic view of an illustrative metallurgical precipitating system constructed in accordance with the principles of the present invention.

As shown on the drawings:

The system illustrated in the drawing comprises two substantially identical precipitators or vessels indicated generally at reference numerals 10 and 11. The two precipitators are connected for series operation, whereby a portion of the copper in a solution is precipitated in vessel 10 and then the somewhat depleted solution is piped to vessel 11 where a remaining portion of the copper is precipitated. Additional vessels can be connected in series, depending upon certain parameters such as the type and the strength of solution, the type of precipitant, the size of the vessels, etc. Two or more vessels can also be connected in parallel for substantial precipitation of all of the copper in one pass of the solution through the scrap iron, depending upon the circumstances involved.

Since both vessels 10 and 11 are identical, common reference numerals will be used throughout the following description to identify similar parts of each.

The precipitators or vessels each comprise a housing 12 for receiving a charge of precipitant as indicated at 13. In the embodiment illustrated, the precipitant may comprise a conglomeration of pieces of scrap iron such as shredded beer cans, granulated cast iron or any suitable precipitant.

The housing 12 includes an upper portion 14 and a lower portion 16, the upper portion comprising a side wall 17 and the lower portion comprising an enclosure wall 18. The copper solution is introduced into the vessel 10 through a pressurized conduit 19 terminating at a nozzle 20 extending through the side wall 17 into the upper portion 14 of the vessel.

The side wall 17 is represented as being straight in cross-section since the present invention does not require an inverted conical configuration to reduce the velocity of the solution as it flows upwardly in the vessel. For instance, the side wall 17 may be tubularly shaped or may be rectangular in horizontal cross-section or otherwise formed, depending upon the economies of fabrication and construction.

The mass of scrap iron at 13 is supported within the vessel 10 by any suitable perforated inert material such as a stainless steel wire or screen basket shown at 21. The basket is secured to an inner face 22 of the side wall 17 in any suitable fashion. The basket itself is frustoconically shaped and comprises a large end 23, which may be of the same diameter as the inner diameter of the side wall 17, a small or smaller end 24 and a converging or tapered side wall 26.

The vessel 10 may be charged with scrap iron by means of an endless conveyor or similarly suitable conveyance indicated at 127 which supplies the scrap iron through an opening 28 formed in a top wall 29 of the vessel. The conveyor 127 may be conveniently located below a hopper or the like device containing an adequate supply of scrap iron, as will be understood by the skilled artisan.

In accordance with this invention, one or more ultrasonic sound generators are used to scrub or clean precipitated copper particles from the surfaces of the various pieces of scrap iron which comprises the mass 13. Although the specific number and location of ultrasonic generators, which are indicated at reference numeral 27, may depend upon various conditions at each installation, the illustrated embodiment indicates a total of ten generators in each vessel spaced circumferentially in a radial plane around the inner periphery of the side wall 17 and aligned with the smaller end 24 of the basket 21.

This arangement, in combination with the inverted frusto-conical configuration of the basket 21, provides for substantial vibration of the mass of scrap iron 13.

In operation, a stream of the copper solution is introduced into the vessel 10 through the nozzle 20 at a relatively reduced velocity whereby the solution rises or flows in the direction of the mass 13 at a velocity of about 5 feet per second. As the solution flows through the perforated basket 21 and the mass 13, a reaction occurs whereby atoms on the exposed surfaces of the iron, which is higher in the electromotive series than copper, are exchanged for ions of copper in the solution. In the illustrated arrangement, the solution may not be completely barren after it passes through the mass 13 and consequently is removed through an outlet 20 connected to another conduit 19 for supplying the partially depleted solution to the second vessel 11.

After a given period of time substantially all of the exposed surfaces of the iron have become coated or plated with copper particles. The ultrasonic generators 27 are then activated to scrub the copper particles from the iron. In the arangement of the vessel 10 shown in the drawings in which the side wall 17 extends upwardly, the copper particles removed from the iron settle downwardly through the up-flowing solution since the low velocity of the solution is too low to dynamically suspend the particles.

After substantially all of the copper particles have been removed from the iron, the ultrasonic generators are deactivated to enable the iron to again become coated. By regulating the time period of pulsations of the ultrasonic generators, the size of the copper particles produced can be controlled to a relatively high degree.

The copper particles scrubbed from the iron settle gravitationally downwardly into the lower portion 16 of of the vessel 10. The zone 16 is below the nozzle 20 and is therefore in a state of quiescence. As a result, the copper particles settle on an inner surface 31 of the wall 18.

The wall 18 slopes downwardly toward an outlet 32 connected to a drain 33 for removing the copper particles from the vessel 10. Suitable means are provided for drawing the copper particles out of the outlet 32 at appropriate intervals after a sufficient quantity has been accumulated. Such means may comprise a valve and constant density pump arrangement, as will be understood by those skilled in the art. Since the accumulated copper particles can be removed from the vessel 10 without interruption of the supply of solution through the nozzle 20, the precipitating process of this invention is continuous as contrasted with the batch operations of the prior methods.

Since some of the settled copper particles may adhere to the inner surface 31 of the wall 18, a rotatable removal device is provided for flushing the particles through the drain 33. An exemplary embodiment of such a device comprises a rake 34 extending in parallel relation to the wall 18 and mounted on a shaft 36 which, in turn, is journaled for rotation as indicated by the arrow 37.

In order to trap the hydrogen gas which is released during the process and which bubbles up to the top of the vessel 10, the top wall 29 is curved inwardly from the side wall 17 to provide an annular shroud covering a substantial portion of the top of the vessel. A hydrogen return line 38 is mounted on the vessel 10 anad terminates at one end 39 located within the shroud formed by the top wall 29. The end 39 is open and the gas is drawn through line 38 by means of a blower or pump 40 and discharged at a nozzle 41 located at an opposite end of the line 38 disposed within the nozzle 20 of the conduit 19. Thus, the released hydrogen gas is circulated into the copper solution as the solution enters the vessel 10, resulting in a reduced consumption of iron and solution as well as a neutralization of many other oxidizing agents such as dissolved atmospheric oxygen.

The ultrasonic generators may be of any suitable type, and may be operated electronically or by pressurized fluid as will be understood by those skilled in the art. The generators may be interconnected as indicated at 42 for simultaneous pulsation. Suitable controls including a timer may be provided for selectively programming the pulsation of intervals of operation.

I claim as my invention:
1. In a copper precipitator apparatus,
   a vessel for containing an acidic solution,
   a shrouded top on said vessel for trapping hydrogen gases generated during the chemical process which follows introduction of a ferrous precipitant into the acidic solution,
   support means in said vessel for supporting a supply of scrap iron below said shrouded top, and
   means for recirculating the hydrogen gases from said shrouded top back into the interior of said vessel and into the solution contained therein comprising a return line having blower means therein,
      said return line having an opening at one end disposed in said shrouded top of said vessel to communicate with the trapped hydrogen gases and having a discharge opening at its opposite end below said support means to direct the hydrogen gases pressurized by the blower means into the acidic solution in the vessel,
   thereby to inhibit the dissolution of iron by the acidic solution.
2. In a copper precipitator apparatus as defined in claim 1,
   said support means comprising a basket to hold a charge of scrap iron in the vessel,
   and scrubbing means in the vessel to selectively scrub precipitated copper off of the surface of the scrap iron,
   said discharge opening on said return line being disposed below the level of said basket.
3. In a copper precipitator apparatus as defined in claim 2,
   said scrubbing means comprising a plurality of ultraoonic sound-generating transducers spaced around said basket and between the upper and lower ends thereof.
4. In a copper recipitator apparatus as defined in claim 3,
   and raking means movable over the bottom of said vessel and having engagement with an adjoining bottom wall of said vessel to rake off precipitated copper particles collected thereon.

References Cited

UNITED STATES PATENTS

| 724,076 | 3/1903 | Alzugaray et al. | 266—22 |
| 1,066,968 | 7/1913 | Wilcox | 266—22 |
| 1,217,437 | 2/1917 | Gahl | 75—109 X |
| 1,226,611 | 5/1917 | Vandercook | 266—22 |
| 2,702,260 | 2/1955 | Massa | 134—1 |
| 2,949,121 | 8/1960 | Kearney | 134—1 X |
| 2,860,646 | 11/1958 | Zucker | 134—1 X |
| 2,584,700 | 2/1952 | Stubblefield | 75—109 X |

J. SPENCER OVERHOLSER, Primary Examiner

R. S. ANNEAR, Assistant Examiner

U.S. Cl. X.R.

23—285; 134—1